United States Patent [19]
Saito

[11] 3,932,892
[45] Jan. 13, 1976

[54] SUPERMINIATURE CASSETTE TAPE RECORDER

[75] Inventor: Shoichi Saito, Tokyo, Japan

[73] Assignee: Olympus Optical Co., Ltd., Tokyo, Japan

[22] Filed: Dec. 29, 1972

[21] Appl. No.: 319,859

[30] Foreign Application Priority Data
Dec. 29, 1971  Japan.................................. 47-180

[52] U.S. Cl.................................... 360/96; 360/60
[51] Int. Cl.²......................................... G11B 23/06
[58] Field of Search....................... 360/96, 60, 109

[56] References Cited
UNITED STATES PATENTS

| | | | |
|---|---|---|---|
| 3,550,983 | 12/1970 | Probst................................ | 360/105 |
| 3,581,022 | 5/1971 | Shigetomi et al..................... | 360/60 |
| 3,591,186 | 7/1971 | Murata................................ | 360/93 |
| 3,649,773 | 3/1972 | Trammell........................... | 360/109 |
| 3,794,769 | 2/1974 | Neff.................................... | 360/109 |

*Primary Examiner*—Alfred H. Eddleman
*Assistant Examiner*—Jay P. Lucas
*Attorney, Agent, or Firm*—Haseltine, Lake & Waters

[57] ABSTRACT

A superminiature cassette tape recorder comprising a flat elongated upper casing, a flat elongated lower casing, and an intermediate frame held between the upper and lower casings and having fittings made integral therewith. The tape recorder further comprises a tape driving mechanism, a cassette raising member, a switch operating member inclusive of a rotatable switch button selectively assuming a recording-reproducing position, a rewinding position, and a stopping position, a record push button and a fast-feed push button, and parts such as a battery, speaker, magnetic heads, all of these driving mechanisms, operating members and parts being so constructed and arranged that they can be assembled beforehand and then mounted on the fitting of the intermediate frame.

5 Claims, 26 Drawing Figures

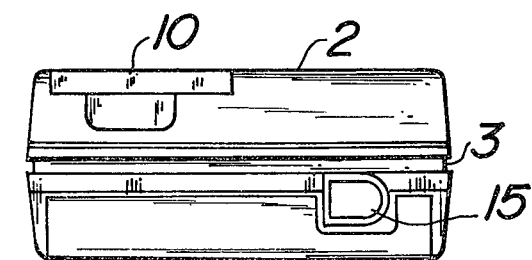
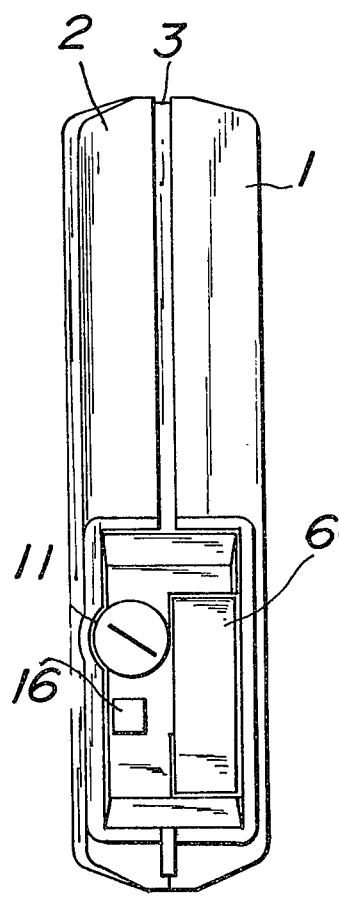
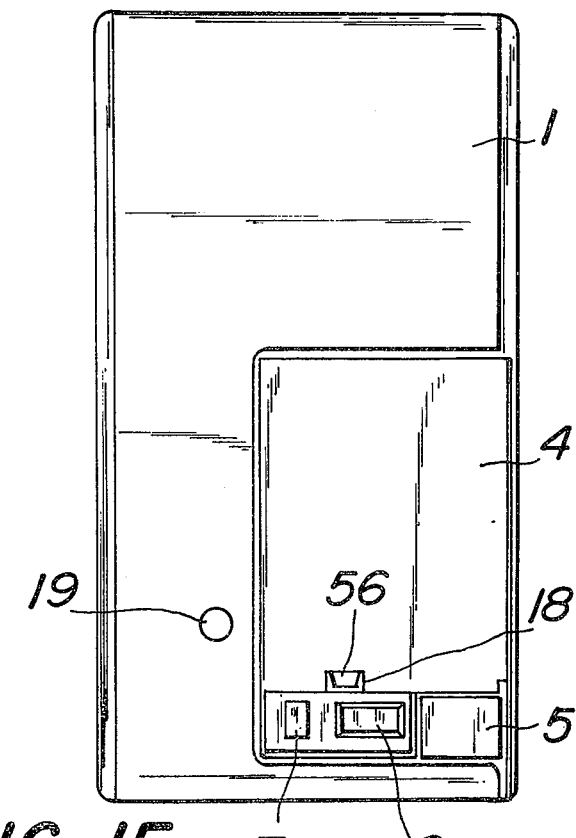
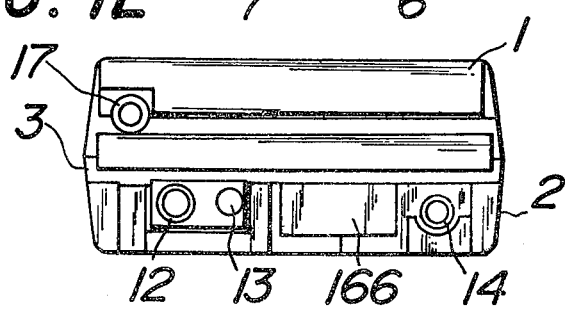

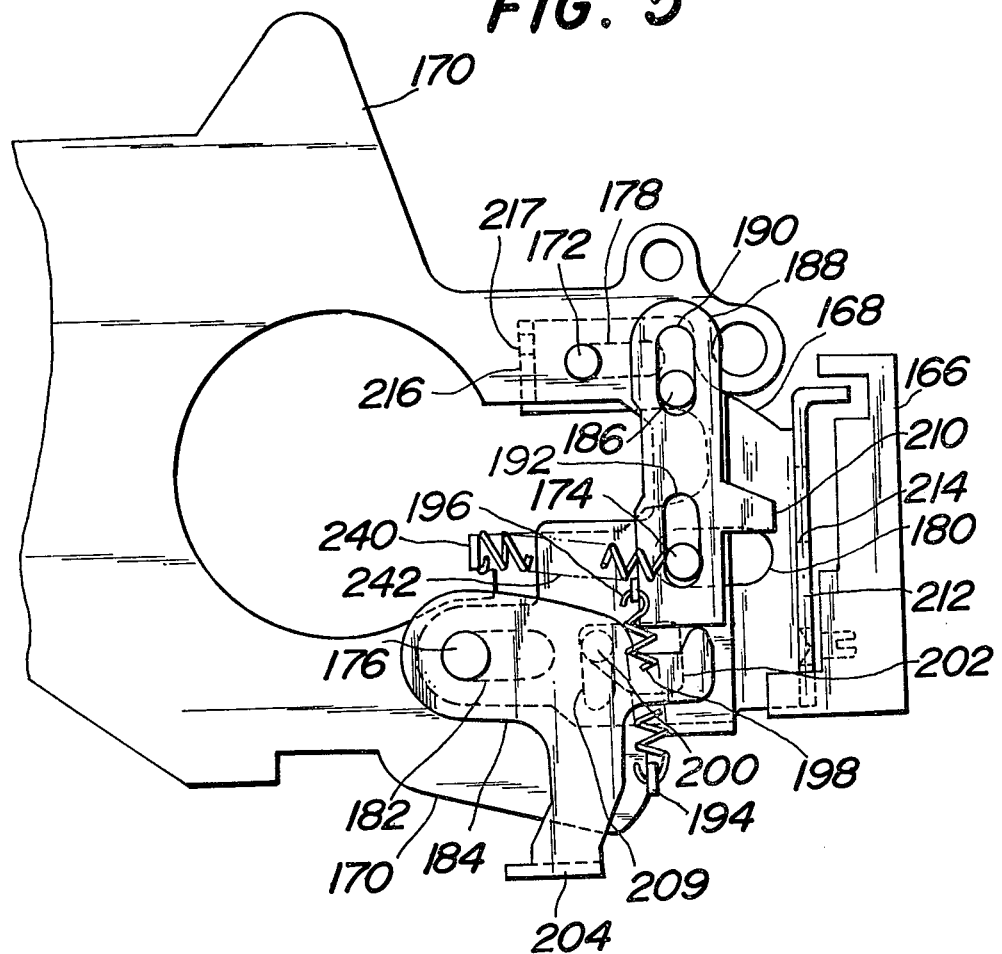

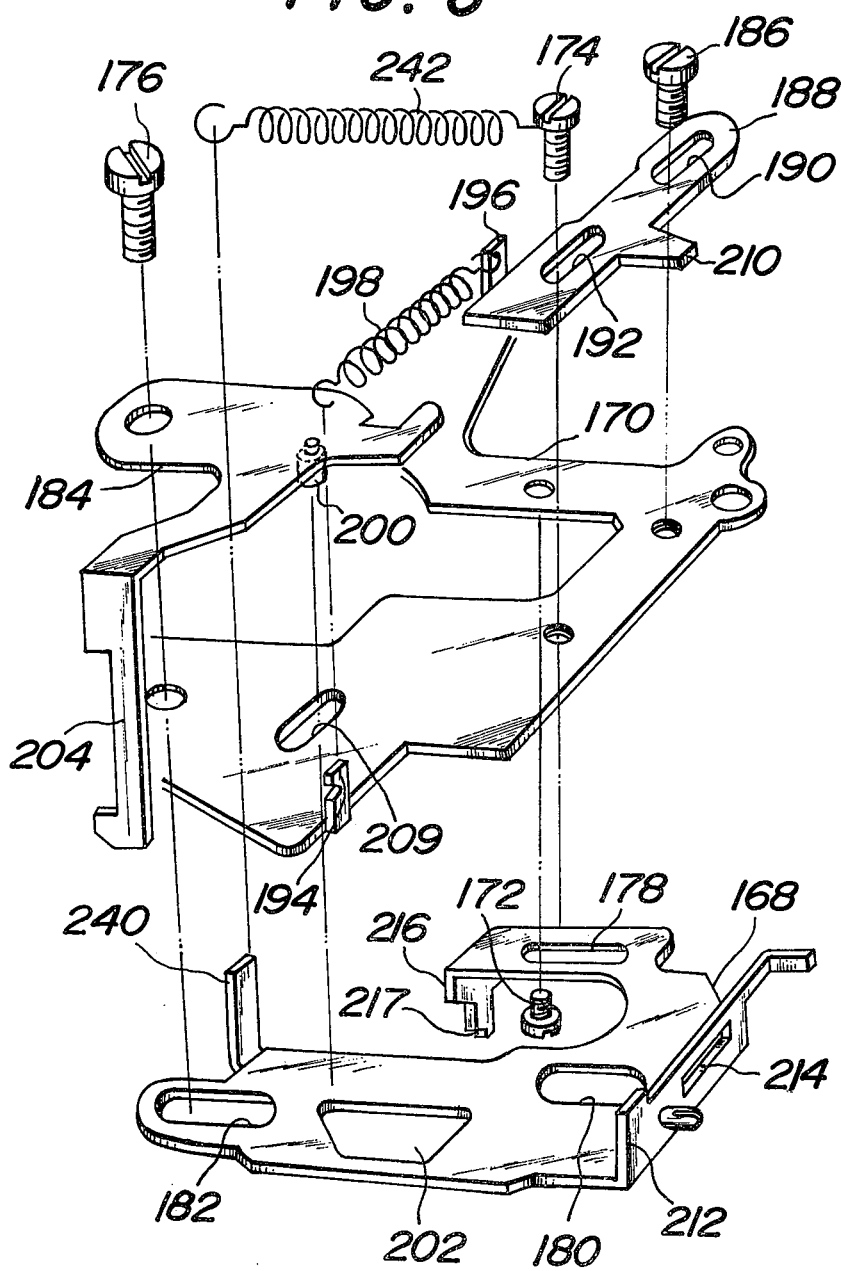

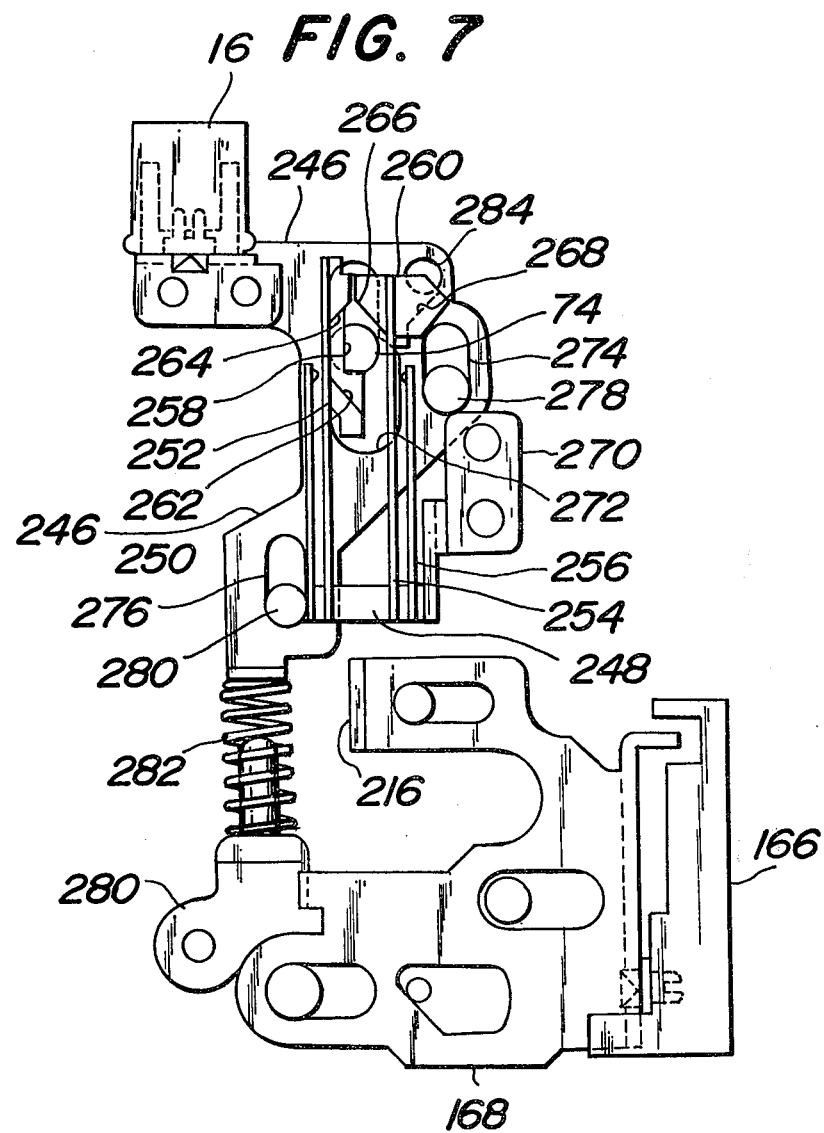

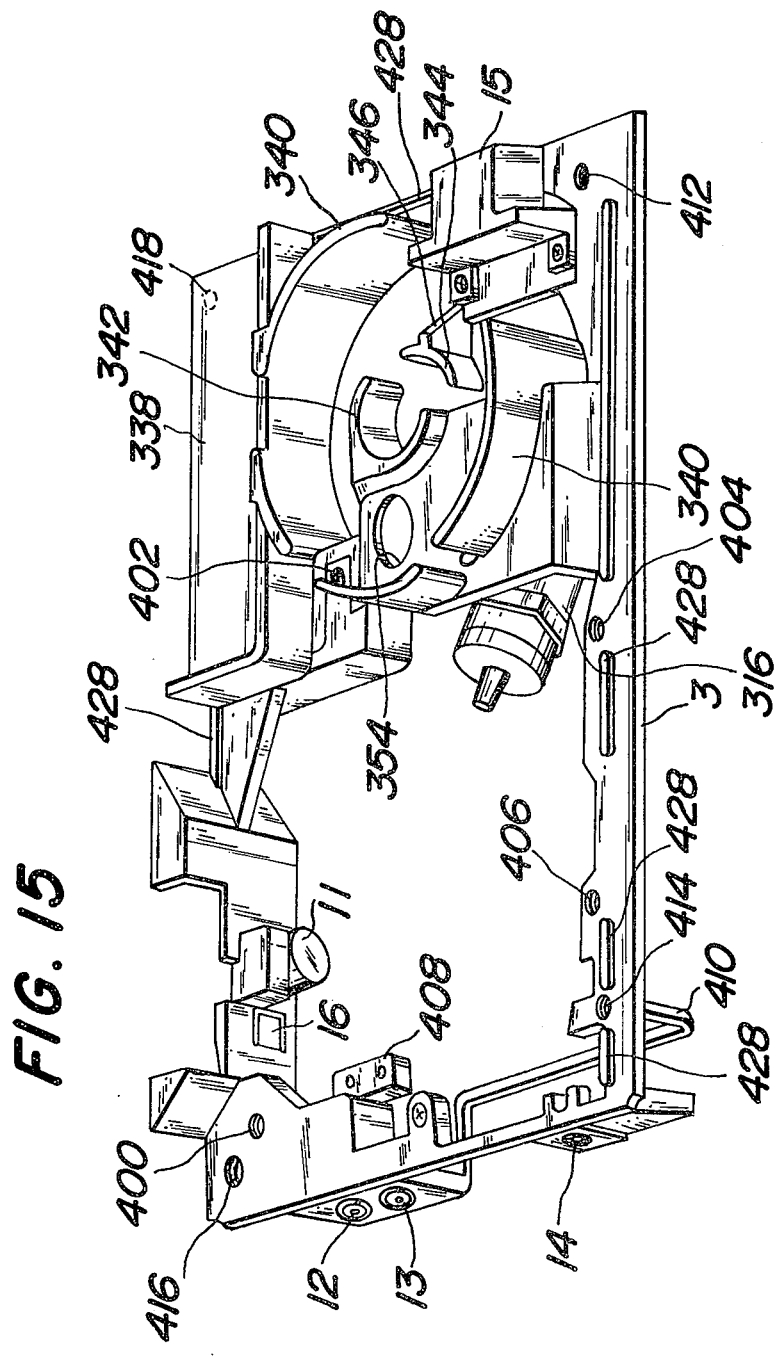

SUPERMINIATURE CASSETTE TAPE RECORDER

This invention relates to cassette tape recorders, and more particularly to a superminiature cassette tape recorder operable in the state as held in one hand of a user.

Such kind of superminiature cassette tape recorder has heretofore been developed and described, for examples, in U.S. Pat. No. 3,581,022. In the conventional superminiature cassette tape recorder, however, various kinds of driving mechanisms, for example, a tape driving mechanism, recording, reproducing, fast-feeding and rewinding mechanisms; various kinds of operating members, for example, a cassette mounting member, cassette raising member; various kind of fittings, for example, a battery receiving fitting, speaker receiving fitting, level meter receiving fitting, jack fitting; and various kinds of parts of an electric circuit, for example, a printed circuit board must be incorporated into a casing of the tape recorder and assembled together therein. In addition, these mechanisms, members, fittings and parts must be connected each other to meet special need, for instance, it is required to incorporate a level meter into a tape recorder casing in the recording mode of operation, incorporate a speaker into the tape recorder casing in the reproducing mode of operation. Thus, the conventional superminiature cassette tape recorder has disadvantage that the above mentioned mechanisms, and more particularly the tape driving mechanism becomes very complicated in construction, that a number of operating members must be disposed at accessibly operative positions, and that the tape recorder becomes difficult and troublesome in manufacture and adjustment and hence becomes expensive. Moreover, it is sometimes convenient to incorporate such parts as the battery, speaker and microphone into the tape recorder casing. A cassette tape recorder adapted to mount all of these parts in one casing has heretofore been proposed. But, such tape recorder is comparatively large in size and hence is inoperable in the state as held in one hand of a user. If such tape recorder is made superminiature in size, it becomes more complicated in construction and is required to use a number of parts, and as a result, incorporation of these parts in an extremely small casing becomes considerably troublesome and these parts must accurately be worked and assembled together and hence the tape recorder becomes expensive.

The object of the invention, therefore, is to provide a superminiature cassette tape recorder which can enclose not only a tape driving mechanism and various kinds of operating members but also parts such as a battery, speaker, microphone, etc. can be incorporated into one casing, and which is of so small in size that which is capable of being held in one hand of an operator.

Another object of the invention is to provide a superminiature cassette tape recorder of which parts are small in number, which can easily and rapidly be assembled, and which is less expensive.

A feature of the invention is the provision of such an improved superminiature cassette tape recorder comprising a flat elongated upper casing, a flat elongated lower casing, and in intermediate frame held between the upper and lower casings and having fittings made integral therewith and adapted to mount thereon a battery, a speaker, a chassis to which are secured a tape driving mechanism and operating members inclusive of record-reproduction, fast-feed and rewind operating members, a printed circuit board constituting an electric circuit of the tape recorder, and a driving motor.

Such superminiature cassette tape recorder according to the invention is capable of mounting all of parts suitably assembled together beforehand on the intermediate frame, reducing the parts in number, making the assembly considerably easy and rapid, and making the cost less expensive.

For a better understanding of the invention, reference is made to the accompanying drawings, in which:

FIG. 1A is a front view of a superminiature tape recorder according to the present invention;

FIG. 1B is its side view, seen from the left-hand side of FIG. 1A;

FIG. 1D is an end view, seen from the upper end of FIG. 1A;

FIG. 1E is an end view, seen from the lower end of FIG. 1A;

FIG. 5 is a plan view, illustrating a record operating member usable in the tape recorder according to the invention;

FIG. 6 is its exploded perspective view;

FIG. 7 is a plan view, illustrating a switch operating member for selectively effecting recording, reproducing, fast-feeding and rewinding modes of operation of the tape recorder according to the invention;

FIG. 15 is a perspective view of an intermediate frame usable in the tape recorder according to the invention.

Like parts are designated by like numerals and symbols throughout the drawings.

Figure 1C:
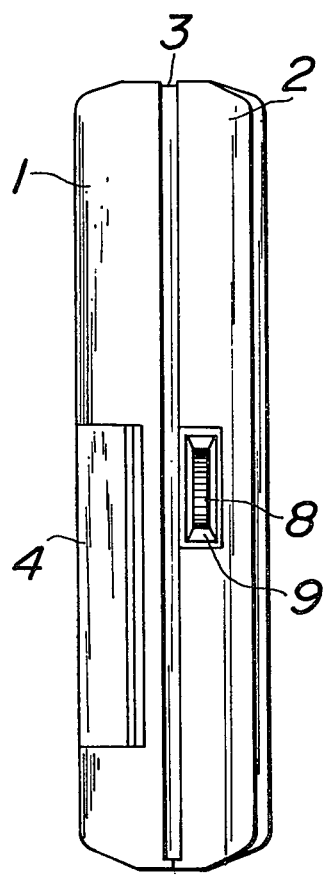
FIG. 1C is a side view, seen from the right-hand side of FIG. 1A.
Figure 1F:
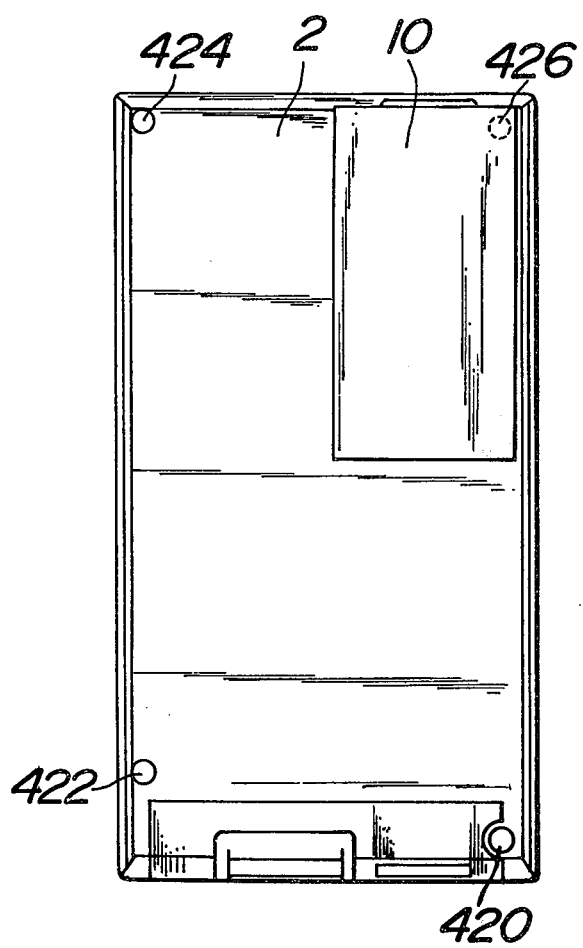
FIG. 1F is a rear view of FIG. 1A.

Referring to FIGS. 1A to 1F, showing a cassette tape recorder according to the invention, a flat elongated casing capable of being held in one hand of an operation is made of an upper casing 1, a lower casing 2, and an intermediate frame 3 held between these two casings 1 and 2. As shown in FIGS. 1A and 1C, provision is made of a cover 4 for covering a cassette mounting fitting made integral with the upper casing 1. The cover 4 is hinged at its one side edge to the upper casing 1. A microphone 5 is incorporated at the lower side of the cover 4 into the upper casing 1. A window 6 is formed on the upper casing 1 adjacent to the microphone 5 so as to view numbers of a counter therethrough. In addition, a hole is formed on the upper casing 1 so as to extend a reset button 7 therethrough. As shown in FIG. 1C, a hole 9 is formed on the right side wall of the lower casing 2 so as to expose a volume control knob 8. As shown in FIGS. 1D and 1F, a battery receiving fitting formed integral with the intermediate frame 3 is covered at its rear side by a cover 10. The cover 10 is secured at its one corner to the battery receiving fitting by a screw 426. As will be described hereinafter, a printed circuit board, constituting the electric circuit of the tape recorder is also mounted on the intermediate frame 3. Those portion of the operating members which can be seen from the outside of the tape recorder will now be described. As shown in FIG. 1B, a level meter 11 and fast-feed button 16 are mounted at the left side of the lower casing 2 on the intermediate frame 3, while a record-reproduction and rewind button 66 is mounted at the left side of the upper casing 1 on one face of the intermediate frame 3. As shown in FIG. 1E, an insert jack 12 of an outside microphone, insert jack 13 of a remote switch and insert jack 14 of an earphone and also a record button 166 are mounted at the lower end of the lower casing 2 on the opposite face of the intermediate frame 3. A ring 17 for connecting a suspender band (not shown) is secured at the lower end of the upper casing 1 to one face of the intermediate frame 3. An insert jack 15 of an AC supply source is mounted at the upper end of the upper casing 1 on one face of the intermediate frame 3. A rectifier is not incorporated into the casing, but is incorporated into a plug of a consent of an AC supply main line.

As shown in FIG. 1A, a notch 18 is formed on the lower edge of the cover 4 so as to receive a projection 56 of a cassette push up lever plate to be described later.

The cover 4 and projection 56 are raised above the surface of the counter to form a gap therebetween into which the user can insert his finger for the purpose of pushing up the cassette together with the cover 4.

As shown in FIG. 1A, a small hole 19 is formed on the upper casing 1 through which can adjust a screw for changing the position of a magnetic head with respect to the tape from the outside of the tape recorder to be described hereinafter. After this screw has been adjusted, the small hole 19 is closed by covering a decoration sheet or plate thereon to hide the small hole 19 out of sight.

In FIG. 1F, 420, 422, 424 and 426 designate screws for securing the lower cover 2 to the intermediate frame 3.

The above mentioned operating members and parts are inserted through corresponding openings formed on the casing and mounted on the fittings made integral with the intermediate frame 3.

Figure 2B:
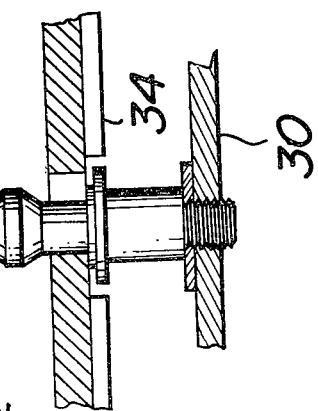
FIG. 2B is a front view, illustrating a cassette mounting member, partly in section.

In FIG. 2 is shown a chassis 30 seen from the cassette mounting side, with the intermediate frame 3 removed. A cassette receiving plate 34 is secured to one face of the chassis 30 through four spacers 32 each having a suitable height so as to form a space between the cassette receiving plate 34 and the chassis 30 as shown in FIG. 2B. A capstan shaft 36 is extended through a hole formed on the cassette receiving plate 34. A tape take up shaft 38 and tape supply shaft 40 are extended through corresponding holes formed on the cassette receiving plate 34, respectively. A pair of cassette guiding and locking pins 42 and 44 are also extended through corresponding holes formed on the cassette receiving plate 34, respectively. Each of these cassette guiding and locking pins 42, 44 has a reduced stem portion formed between an enlarged chamfered head and a shoulder portion and adapted to be engaged with a hole formed on the cassette base plate shown by hatching lines in FIG. 2B so as to prevent loosening of the cassette when it is mounted on the cassette receiving plate 34. A pair of cassette positioning pins 43 and 45 are extended through holes formed on the cassette receiving plate 34, respectively. These cassette positioning pins 43 and 45 are slightly projected out of the cassette receiving plate 34 and the upper ends of these pins are made in contact with the cassette casing so as to define the level at which the cassette is mounted. To the chassis 30 are secured a cassette holding member comprising a pair of claws 46, 48 engageable with an upper shoulder portion formed on the side edge of the cassette when it is mounted on the cassette receiving plate 34 and a leaf spring 50 disposed between the claws 46 and 48 and adapted to bias the upper part of the side edge of the cassette obliquely downwards. Thus, if the cassette is mounted on the cassette receiving plate 34, it is firmly held by the claws 46, 48 and spring 50 as shown in FIG. 3.

Figure 3:
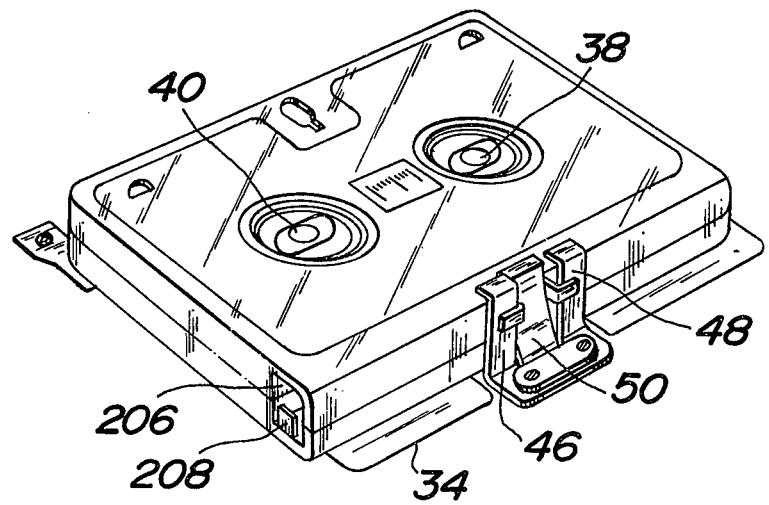
FIG. 3 is a perspective view, illustrating a cassette mounted on a cassette mounting plate.
Figure 4B:
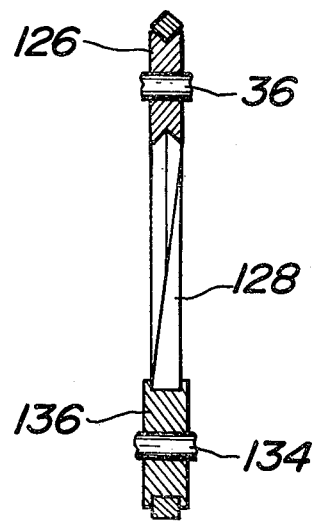
FIG. 4B is a section illustrating a pulley and bolt shown in FIG. 4A.
Figure 4A:
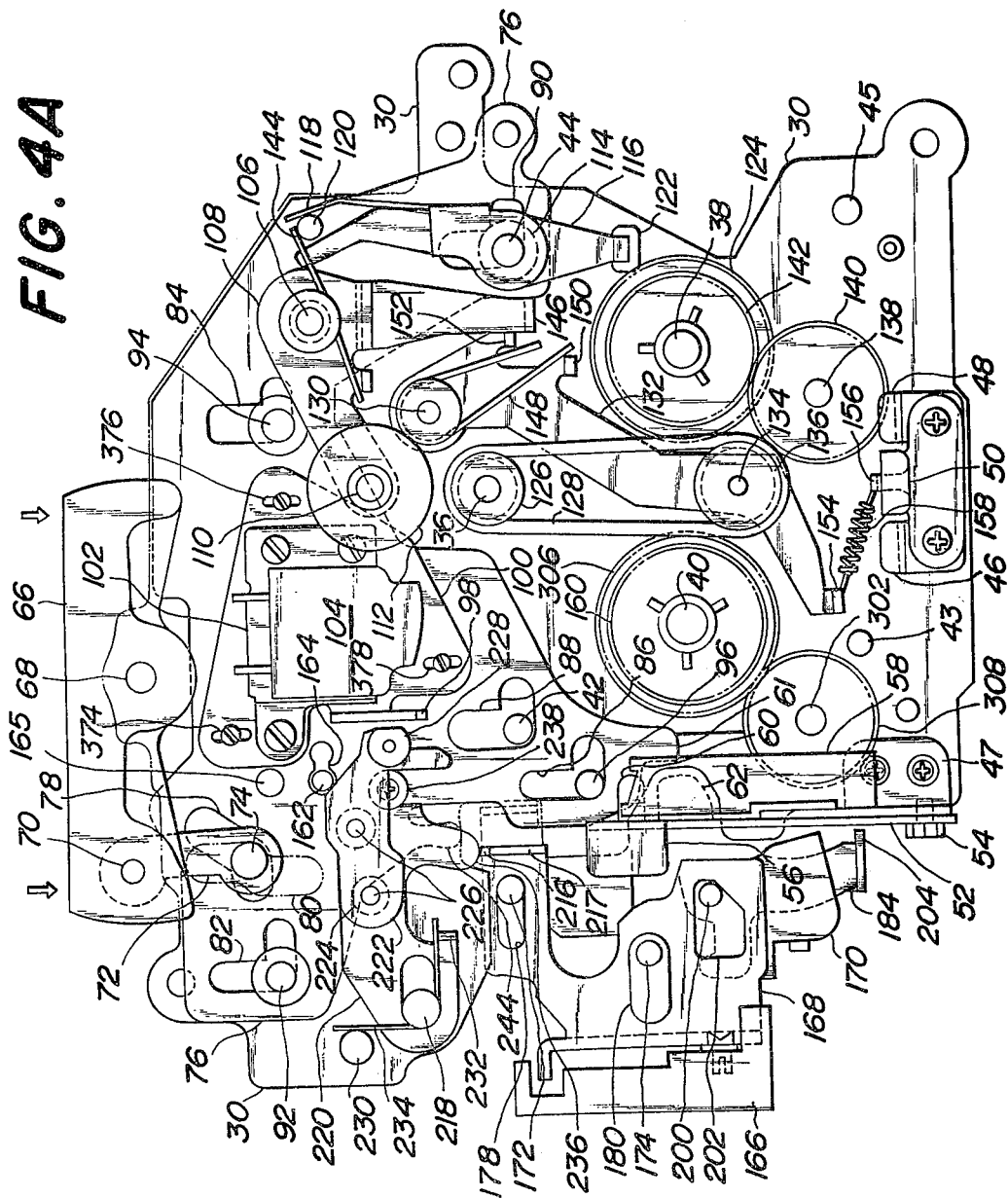
FIG. 4A is a plan view similar to FIG. 2, with the cassette receiving plate and counter removed therefrom.

As shown in FIG. 4A, an L-shaped member 47 is secured to the chassis 30 by a pair of screws. A lever plate 52 is pivotally secured at its one end to the L-shaped member 47 by a screw 54. The lever 52 is provided at its free end with a first projection 56 (refer also to FIG. 1A) operable with a finger of a user so as to rotate the lever 52 upwards in FIG. 4. The lever plate 52 is provided with a leaf spring 58 secured thereto and with a second projection 60 penetrating beneath the leaf spring 58. When the user brings his finger into engagement with the first projection 56 so as to rotate the lever 52 upwards, the second projection 60 is raised together with the leaf spring 58 against the action of spring which is then brought into contact with the base plate of the cassette. Thus, when the cassette is mounted on the cassette receiving plate 34 as shown in FIG. 3, the upward rotation of the lever plate 52 ensures pushing up of the cassette. The lever 52 is provided with a third projection 62 of which operation will be described hereinafter.

Figure 2A:
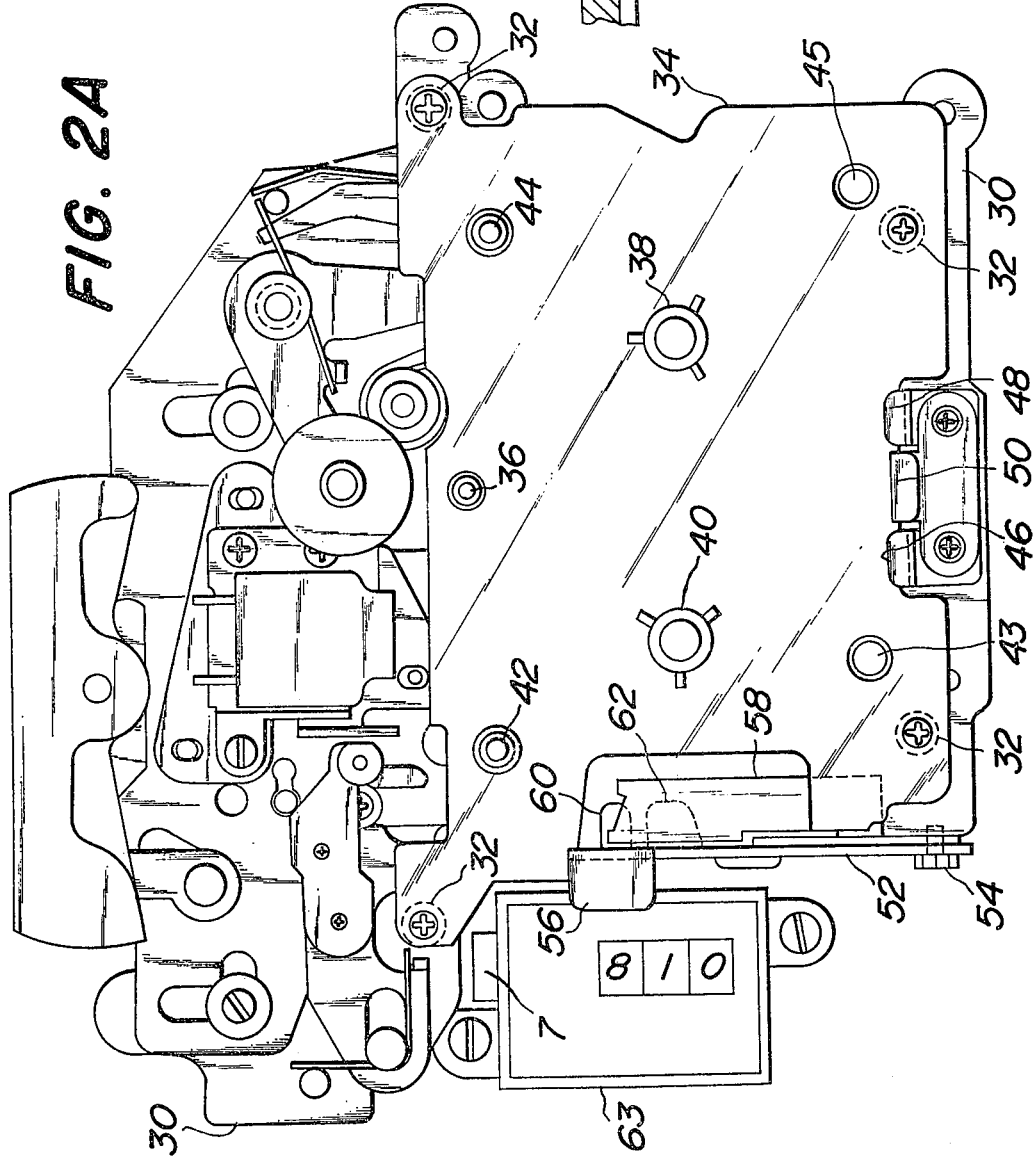
FIG. 2A is a plan view, illustrating various driving mechanisms, operating members, a counter and a cassette receiving plate, usable, in the tape recorder according to the invention.

As shown in FIG. 2A, provision is made of a three digits counter 63 adapted to be interlocked with the tape supply shaft 40. The counter 63 is reset to zero when the reset button 7 is pushed. An interlocking mechanism between the counter 63 and the tape supply shaft 40 will be described hereinafter.

The members for mounting and pushing up the cassette has been described. Now, the record, reproduction, fast-feed and rewind operating members will be described.

In FIG. 4A are shown inside parts of various operating members with the cassette receiving plate 34 removed. In FIG. 4, that part of the chassis 30 which is hidden from view by other parts are shown by dot and dash lines, while those parts of members other than the chassis 30 which are hidden from view by any other members are shown by dotted lines. A rotatable switch button 66 is pivotally secured substantially at its center by a shaft 68 to the chassis 30. The horizontal position of the switch button 66 shown in FIG. 4 corresponds to a stop position To the left end of the switch button 66 is pivotally secured a lever 72 by a shaft 70. To the free end of the lever 72 is secured an operating pin 74. The operating pin 74 extends through a ⌐-shaped groove 78 formed on a sliding plate 76 slidable along an L-shaped passage and a ⌐-shaped groove 80 formed on the chassis 30 and projects into the rear side of the chassis 30. The sliding plate 76 is formed with five L-shaped grooves 82, 84, 86, 88 and 90 into which are penetrated pins 92, 94, 96, 42 and 44 projected from the chassis 30, respectively. Downward depression of the switch button 66 causes the sliding plate 76 to slide downwards by means of the operating pin 74. On the sliding plate 76 are mounted a record-reproduction magnetic head 104 which is secured to a base plate 100 formed with a tape guide 98 through a fitting plate 102 and a pinch roller 112 pivotally secured to the end of one arm of an L-shaped lever 108 by a shaft 110, the L-shaped lever 108 being pivotally secured to the chassis 30 by a shaft 106. A member for operating the magnetic head 104 will be described hereinafter. As described above, the downwards sliding movement of the sliding plate 76 results in downward movement of the tape guide 98, magnetic head 104 and pinch roller 112, all of which being brought into contact with the tape enclosed in the cassette. Particularly, the pinch roller 112 is resiliently urged against the tape by the action of a capstan shaft 36 and a spring 114, and as a result, the rotation of the capstan shaft 36 causes the tape to move at a constant speed.

To the cassette guide and holding pin 44 is pivotally secured a lever 116 through a spacer 114. To the lever 116 is secured a leaf spring 118 which is in engagement with a pin 120 secured to the sliding plate 76 and adapted to bias the lever 116 in a clockwise direction. To one end of the lever 116 is secured a brake shoe 122 made of rubber and adapted to be brought into engagement with a brake gear 124 secured to the shaft 38 by the action of the leaf spring 118. In the stop position shown in FIG. 4, the brake shoe 122 engages with the gear 124 so that the take up shaft 38 is stopped. But, as above described, if the sliding plate 76 slidably moves downwards, the pin 120 is urged against the lever 116 to rotate it in a counterclockwise direction against the action of the leaf spring 118, and as a result, the brake shoe 122 becomes disengaged from the gear 124 to rotate the take up shaft 38.

Now, a mechanism for rotating the tape take up shaft 38 in a clockwise direction will be described. To a capstan shaft 36 is secured a pulley 126 having a groove showing in FIG. 4B and adapted to be engaged with an endless belt 128 made of rubber and having a square section shown in FIG. 4B. To the chassis 30 is pivotally secured a lever 132 by a shaft 130. To the lever 132 is pivotally secured a pulley 136 by a shaft 134, the pulley 136 having a section shown in FIG. 4B. The belt 128 is also brought into engagement with the pulley 136. As a result, if the capstan shaft 36 is rotated in a clockwise direction, the belt 128 is reliably rotated in a clockwise direction by the pulley-belt connection shown in FIG. 4B. To the chassis 30 is pivotally secured an intermediate gear 140 by a shaft 138 and brought into engagement with the gear 142 and the belt 128. The lever 132 is provided at its one end with an upright portion 154, while the cassette holding leaf spring 50 is provided at its lower end with a hang down portion 156. Between the upright portion 154 and the hang down portion 156 is inserted a tension spring 158 so as to bias the lever 132 around the shaft 130 in a counterclockwise direction. As a result, the rubber belt 128 is resiliently urged against the gear 140 in a stable manner as shown in FIG. 4B and the gear 140 is frictionally interconnected with the take up shaft 38 through the rubber belt 128. Thus, if the belt 128 is rotated in a clockwise direction, the gear 140 resiliently engaged with the belt 128 is rotated in a counterclockwise direction, and as a result, the gear 142 threadedly engaged with the intermediate gear 140 is rotated in a clockwise direction and hence the take up shaft 38 is rotated in a clockwise direction.

The above operation makes it possible to carry out the reproducing mode of operation.

Now, the rewinding mode of operation will be described.

If the right end of the switch button 66 is depressed, the operating pin 74 is moved upwards. In this case, the sliding plate 76 is slidably moved towards left by the inclined portion of the groove 78. As a result, the magnetic head 104 and pinch roller 112 mounted on the sliding plate 76 are also moved towards left and become out of contact with the tape. In this case, the pin 120 secured to the sliding plate 76 is also moved towards left, so that the lever 116 is rotated in a counterclockwise direction around the pin 44 to disengage the brake shoe 122 from the gear 124. A lever 108 pivotally secured to the sliding plate 76 by a shaft 106 is biased to rotate in a counterclockwise direction by means of a leaf spring 144 mounted on the lever 108. The lever 108 is provided at its one end with a tag 146 which engages with the side edge of the sliding plate 76, thereby limiting a further counterclockwise rotation of the lever 108. The shaft 130 is further provided with a leaf spring 148 whose free ends are resiliently engaged with projections 150 and 152 formed on the lever 132, respectively. As above described, if the sliding plate 76 is moved leftwards, the tag 146 of the lever 108 is urged against one end of the spring 148, and as a result, the lever 132 is rotated in a clockwise direction against the action of the spring 158 to bring the belt 128 into engagement with a gear 160 frictionally engaged with the tape supply shaft 40. In this case, the energy accumulated in the spring 148 serves to resiliently urge the belt 128 against the gear 160. Under such condition, if the capstan shaft 36 is rotated to rotate the belt 128 in a clockwise direction, the gear 160 is rotated in a counterclockwise direction, and hence the tape supply shaft 40 is rotated in a counterclockwise direction, and as a result, it is possible to rewind the tape.

A ball 162 is supported by the chassis 30 with the aid of a coil spring (not shown) which serves to partially project the ball 162 upwards out of the chassis 30. The sliding plate 76 has a gourd-shaped hole 164 and a circular hole 165 formed at the upper part of the left side hole of the hole 164. If the sliding plate 76 is moved downwards, the ball 162 is clicked into the hole 165 to keep the sliding plate 76 at its lower position. If the sliding plate 76 is moved leftwards, the ball 162 is clicked into the right side hole portion of the hole 164 to keep the sliding plate 76 at its left position.

Now, the recording mode of operation will be described. If it is desired to carry out the recording mode of operation, in the first place a record push button 66 slidably secured to the intermediate plate 170 is depressed and then the left end of the above described switch button 66 is depressed. In FIG. 5 is shown a record operating mechanism seen from its rear side. FIG. 6 is its exploded perspective view. A sliding lever 168 is secured to the record button 166. The sliding lever 168 has grooves 178, 180 and 182, so as to extend pins 172, 174 and 176, projected from the intermediate plate 170 secured to the chassis, therethrough, respectively, and hence guide the sliding lever 168. To the pin 176 is pivotally secured a lever 184. A pin 186 is projected from the intermediate plate 170. A lever 188 has grooves 190 and 192 so as to guide the lever 188 by the pins 186 and 174, respectively. That is, the lever 168 is guided in a horizontal direction seen in FIG. 5, while the lever 188 is guided in a vertical direction. Between a projection 194 from the intermediate plate 170 and a projection 196 from the lever 188 is inserted a tension spring 198 so as to bias the lever 188 downwards. The lower end of the lever 188 engages with one end of the lever 184 so as to rotate the lever 184 around the shaft 176 in a clockwise direction.

A pin 200 secured to the lever 184 engages with the inclined edge of a ▱ -shaped hole 202, so as to keep the levers 184 and 188 in their positions shown in FIG. 5, respectively. The lever 184 is provided at its lower end with a tag 204 which is projected downwards beyond the intermediate plate 170 and chassis 30. The lower end of the tag 204 is opposite to the side edge of the cassette as shown in FIG. 4. As shown in FIG. 3, the cassette is formed at its side wall with a hole 206 which is covered by a fin 208 formed integral with the cassette as shown in FIG. 3. If the cassette is mounted on the cassette receiving plate 34, the lower end of the tag 204 of the lever 184 is located at a position opposing the fin 208 (FIG. 3). The cassette is classified into a cassette adapted to be exlusively used for reproducing mode of operation in which the contents recorded must not be erased and a cassette adapted to be used for recording mode of operation. In the cassette adapted to be exclusively used for reproducing mode of operation, the fin 208 is removed to expose the hole 206, while in the cassette adapted to be used for recording mode of operation, the fin 208 is kept remained as it is. When the cassette adapted to be exclusively used for reproducing mode of operation is mounted on the cassette receiving plate 34, the record button 166 is slightly depressed to slidably move rightwards the lever 168. The hole 202 is also moved rightwards, and as a result, the lever 184 is rotated about the shaft 176 in a counterclockwise direction and at the same time the lever 188 is moved downwards. The intermediate plate 170 has a groove 209 which permits the rotation of the lever 184 at the time when the lower end of the tag 204 is penetrated into the hole 206. The lever 188 is provided at its one side edge with a projection 210 made integral with the lever 188. If the record button 166 is depressed, the projection 210 makes contact with an upright piece 212 to prevent a further depression of the record button 166. Thus, if the cassette adapted to be exclusively used for the reproducing mode of operation is mounted on the cassette receiving plate 34, it is impossible to depress the record button 166 so as to carry out the recording mode of operation, and as a result, there is no risk of the contents recorded being erroneously erased.

If the cassette with the fin 208 is mounted on the cassette receiving plate 34 and then the record button 166 is depressed, the lower end of the tag 204 of the lever 184 comes into contact with the fin 208 to prevent the rotation of the lever 184 and hence the movement of the lever 188. In this case, the projection 210 formed on the lever 188 penetrates into a groove 214 formed on the upright piece 212 of the lever 168, so that it is possible to depress the record button 166 until it can effect the recording mode of operation.

The lever 168 is provided at its one part with an upright piece 216 which projects above the chassis 30. As shown in FIG. 4A, to a shaft 218 secured to the chassis 30 is pivotally secured a lever 220 which has a small piece 222 secured to the lever 220 by screws 226 through a pair of spacers 224. To the small piece 222 is secured an erasing head 228. To the shaft 218 is secured a spring 234 inserted between a pin 230 secured to the chassis 30 and a projection 232 formed on the lever 220. The spring 234 serves to bias the lever 220 so as to rotate it about the shaft 218 in a clockwise direction. If the record button 166 is not depressed, the upper end 217 of the upright piece 216 formed on the lever 168 makes contact with a projection 236 of the lever 220, thereby maintaining the lever 220 in its position shown in FIG. 4A. Thus, if the left end of the switch button 66 is depressed without depressing the record button 166, the reproducing mode of operation is carried out. In this case, the sliding plate 76 is moved downwards to bring the projection 236 of the lever 220 into contact with the top end 217 of the upright piece 216, and as a result, the lever 220 is rotated about the shaft 218 in a counterclockwise direction against the action of the spring 234. In practice, the shaft 218 moves downwards. Thus, the erasing head 228 secured to the lever 222 is not moved downwards and hence is not brought into contact with the tape. Thus, the erasing mode of operation is not carried out.

If the record button 166 is depressed and then the left end of the switch button 66 is depressed, the upper end 217 of the upright piece 216 of the lever 168 becomes disengaged from the projection 236 of the lever 220 and moved rightwards as shown by dot and dash lines in FIG. 4, and as a result, as soon as the sliding plate 76 is moved downwards, the lever 220 is rotated about the shaft 218 in a clockwise direction to bring the erase head 228 into contact with the tape. In this case, the rotation of the lever 220 is limited by a pin 238 secured to the sliding plate 76. As shown in FIG. 5, between a projection 240 of the lever 168 and the pin 174 is inserted a tension spring 242 so as to normally bias the lever 168 rightwards. As described above, if the record button 166 is depressed to its operating position and then the left end of the operating member 66 is depressed, the projection 244 formed on the sliding plate 76 and the projection 236 of the lever 220 are penetrated into the return passage of the upright piece 216 of the lever 168, and as a result, the lever 168 and hence the record button 166 is not returned, but kept remained at its record position.

The fast-feeding mode of operation will now be described. In this case, the left end of the switch button 66 only is depressed to effect the reproducing mode of operation. Then, the fast-feed push button 16 (FIG. 7) is depressed to carry out the fast-feeding mode of operation. That is, if the fast-feed button 16 is depressed, the energizing circuit of the motor is changed so as to rotate it at a high speed.

In FIG. 7 are shown the pin 74 for driving the sliding plate 76, a lever 246 secured to the fast-feed push button 16 and a switch adapted to be operated by the lever 246. Four resilient conductive contact pieces 250, 252, 254 and 256 are arranged in parallel each other and secured to a board 248 made of electric insulating material and secured to the lever 246. The contact pieces 250 and 252 constitute one pair of a first switch contact. The contact pieces 254 and 256 constitute another pair of a second switch contact. To the free end of the contact piece 252 is secured a first operating piece 258 made of an electric insulating material. A second operating piece 260 made of an electric insulating material is secured to the free end of the contact piece 254. A substantially V-shaped notch is formed on the first operating piece 258. 262 designates one of the inclined side edges of the V-shaped notch and 264 designates the other inclined side edge of the V-shaped notch. The second operating piece 260 has a first inclined side edge 266 located in opposition to the inclined side edge 264 and has a second inclined side edge 268 opposing the first inclined side edge 266. The operating pin 74 is positioned in a space formed by the inclined side edges 262, 264 and 266.

FIG. 7 shows a stop position in which the chassis 30 (not shown) is provided at its rear side with the lever 246 secured to the fast-feed button 16 and with the switch at the lower side of the lever 246. In FIG. 7 is shown the rear side of the switch which is positioned beneath the lever 246. A projecting piece 270 of the switch is secured to the intermediate frame 3 by a pair of screws. The lever 246 has a ⌐-shaped groove 272 through which is extended the operating pin 74. The lever 246 has also a pair of grooves 274 and 276 through which are extended pins 278 and 280 secured to the chassis 30, respectively. A compression spring 282 is inserted between the lower end of the lever 246 and a member 280 secured to the chassis 30, so as to bias the lever 246 and hence the fast-feed button 16 upwards. To the lever 246 is secured an operating pin 284 located at a position opposite to the second inclined side edge 268 of the operating piece 260.

In the stop condition shown in FIG. 7, the operating pin 74 occupies in its intermediate position without being engaged with both inclined side edges of the operating pieces 258 and 260.

Figure 8:
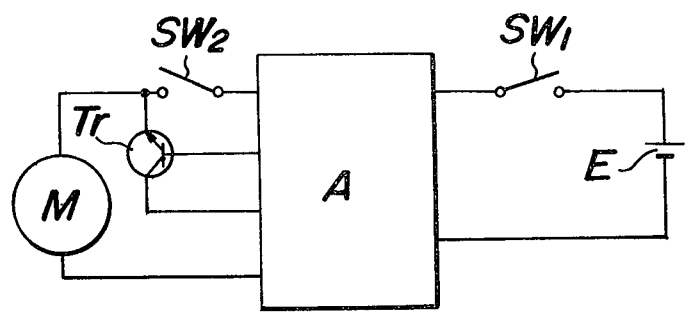
FIG. 8 is an electric circuit diagram, illustrating the operation of the switch of FIG. 7.

The lever 246 takes its upper position, so that the operating pin 284 is not engaged with the second inclined side edge 268 of the operating piece 260, and as a result, both the contact pieces 250, 252 and 254, 256 are opened. In FIG. 8, $SW_1$ and $SW_2$ designate switches constructed by the contact pieces 250, 252 and 254, 256, respectively. As shown in FIG. 8, the switch $SW_1$ is a main switch connected between the electric current supply source E and an amplifier A and the switch $SW_2$ is a switch connected between the amplifier A and a tape driving motor M. If the switch $SW_2$ is closed, a transistor Tr is short-circuited to rotate the motor M at a high speed. If the switch $SW_2$ is opened, a current adjusted by the transistor Tr is supplied to the motor M which is then rotated at a constant speed. In the stop condition shown in FIG. 7, both the switches $SW_1$ and $SW_2$ are opened, so that the motor M is not energized.

As described above, in the recording mode of operation, the depression of the switch button 66 causes the operating pin 74 to move downwards and make contact with the first inclined side edge 262 of the operating piece 258 so as to move the contact piece 252 rightwards, and as a result, the contact piece 252 makes contact with the contact piece 250. That is, the main switch $SW_1$ is closed. In this case, the inclined side edges 266, 268 of the other operating piece 260 are not engaged with the operating pins 74, 284, respectively, so that the contact pieces 254, 256 are kept separated, thereby opening the switch $SW_2$. As seen from FIG. 8, in this case the motor M is rotated at a constant speed to effect recording mode of operation. If the record button 166 is depressed, the lever 168 is moved leftwards, and as a result, the upright piece 216 is penetrated into the downward moving passage of the lever 246, thereby preventing the depression of the fast-feed button 16. This serves to prevent the fast-feed button 16 from being erroneously depressed during the recording mode of operation.

In the reproducing mode of operation, the operating pin 74 is moved to its lower position to close the switch $SW_1$. In this case, if the record button 166 is not depressed and the lever 168 is not moved, it is possible to operate the fast-feed button 16. Thus, in this reproducing mode of operation, if the fast-feed button 16 is depressed, the fast-feeding mode of operation is carried out. That is, the switch $SW_1$ to be operated by the operating piece 258 is closed by the operating pin 74. In addition, the operating pin 284 of the lever 246 makes contact with the second inclined side edge 168 of the other operating piece 260 to close the switch $SW_2$. Thus, in this fast-feeding mode of operation, both switches $SW_1$ and $SW_2$ are closed to rotate the motor M at a high speed, thereby effecting a desired fast-feeding mode of operation.

In the rewinding mode of operation, the operating pin 74 is moved upwards and brought into engagement with the second inclined side edge 264 of the operating piece 258 and also with the first inclined side edge 266 of the operating piece 260 to close both switches $SW_1$ and $SW_2$. Thus, the motor M is rotated at a high speed to effect a desired rewinding mode of operation. During the rewinding mode of operation, if the fast-feed button 16 is depressed, the lever 246 makes contact with the operating pin 74, and as a result, it is impossible to move the lever 246 downwards. Thus, during the rewinding mode of operation the fast-feed button 16 is prevented from being depressed.

Figure 9:
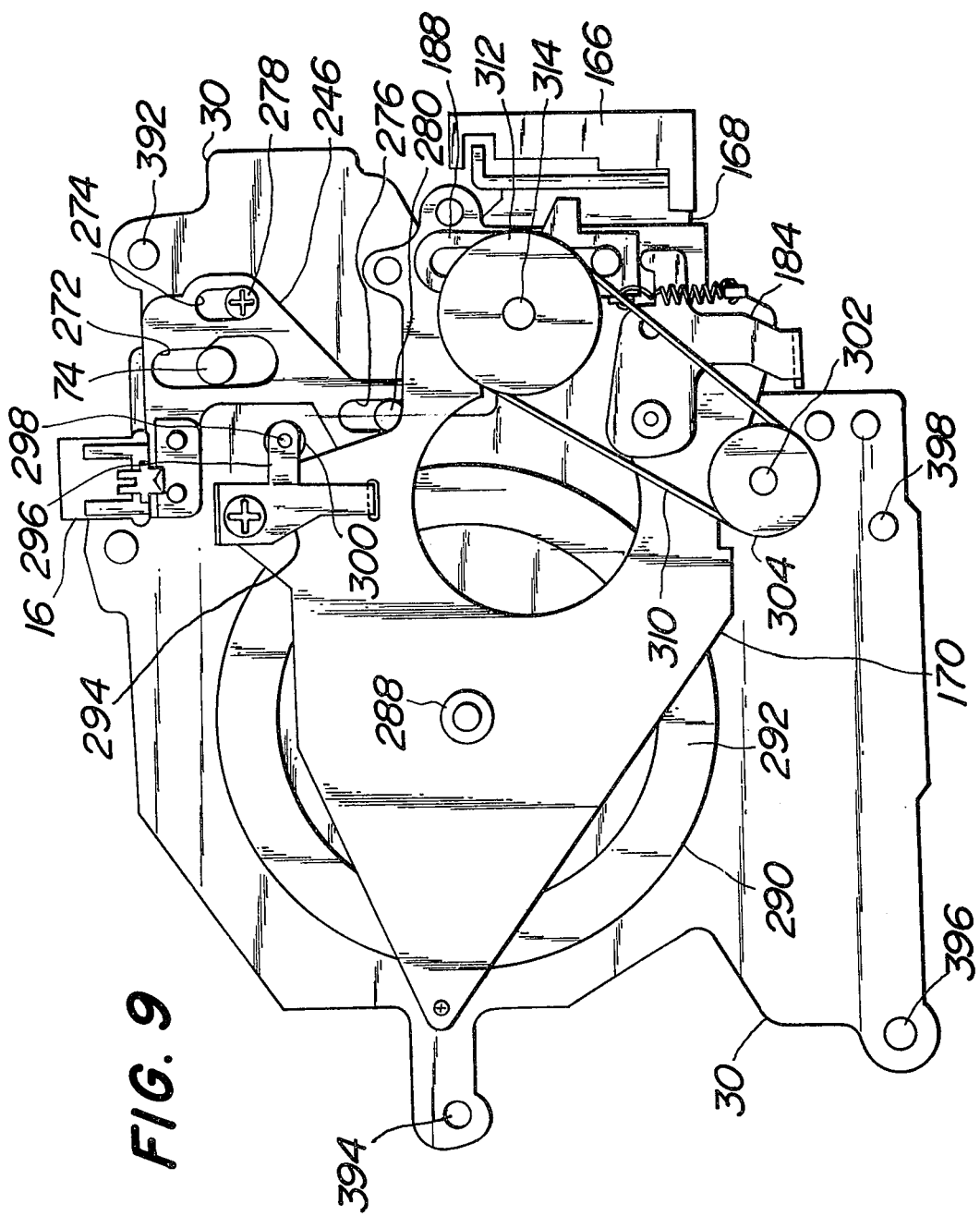
FIG. 9 is a plan view of a chassis and intermediate plate usable in the tape recorder according to the invention, seen from the rear side thereof.

In FIG. 9 is shown the chassis 30 seen from the rear side thereof. The above mentioned switches are not shown. An intermediate plate 170 is secured to the rear face of the chassis 30 and spaced apart in parallel therewith. The capstan shaft 36 (FIG. 4) is extended through the intermediate plate 170 and rotatably journalled in a bearing 288. To the capstan shaft 36 is secured a flywheel 290 whose periphery is covered with a rubber ring 292 which resiliently engages with a driving shaft 318 of the motor 316 so as to transmit the rotation of the motor to the flywheel 290 as will be described hereinafter with reference to FIG. 10. To the intermediate plate 170 is secured a small piece 294 having a projection 296 provided at its front end with a pin 298. Around the pin 298 is wound a coil spring 300 for urging the ball 162 for clicking the sliding plate 76 shown in FIG. 4 against the hole 164 formed on the chassis 30. Moreover, the lever 184 and the sliding plate 188 are secured to the intermediate plate 170. As described hereinbefore with reference to FIG. 5, these plates 184, 188 cooperate with the sliding lever 168 secured to the record button 166.

As described with reference to FIG. 7, on the chassis 30 are mounted the fast-feed button 16 and the lever 246 secured thereto. To the chassis 30 is further pivotally secured a shaft 302 to which is secured a pulley 304. As shown in FIG. 4, to the shaft 302 is secured a gear 308 threadedly engaged with a gear 306 secured to the tape supply shaft 40. As shown in FIG. 9, the pulley 304 engages with one end of an endless belt 310 another end of which also engages with a pulley 312 secured to a shaft 314 which serves as a driving shaft of the counter 63 shown in FIG. 2A.

In the recording, reproducing and fast-feeding modes of operation, if the tape is wound around the take up shaft 38, the supply shaft 40 is rotated in a clockwise direction. The rotation of the tape supply shaft 40 is transmitted through the gears 306, 308, shaft 302 (FIG. 4), pulley 304, belt 310, and pulley 312 to the driving shaft 314 (FIG. 9) of the counter 63 (FIG. 2A). Thus, the shaft 314 is rotated in a clockwise direction in FIG. 9 to advance the counting values of the counter 63 in an adding direction. If the tape is rewound from the take up shaft 38, the counter drivings shaft 314 is rotated in a counterclockwise direction to advance the counting values of the counter 63 in a substracting direction.

Figure 10:
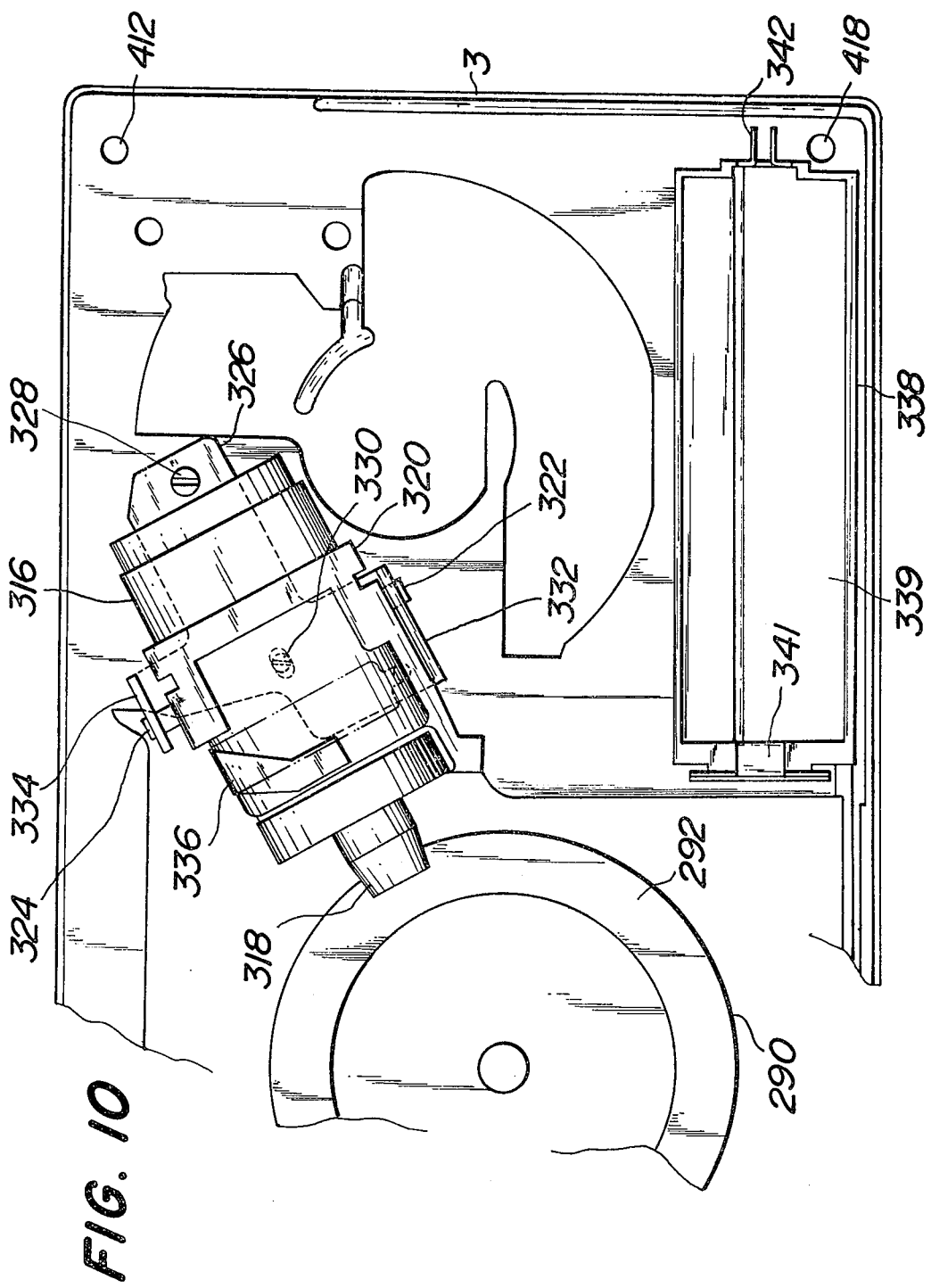
FIG. 10 is a plan view, illustrating a motor mounting member and a part of the intermediate frame usable in the tape recorder according to the invention, seen from the rear side thereof.

A motor mounting mechanism will now be described with reference to FIG. 10 showing the rear side of the motor 316 secured to the intermediate frame 3. The driving shaft 318 of the motor 316 is urged against the rubber ring 292 of the flywheel 290. For this purpose, around a casing of the motor 316 is fitted an annular member 320 provided at its each end with pin 322, 324 projected therefrom. To the intermediate frame 3 is secured a motor mounting plate 326 by a pair of screws 328, 330. The motor mounting plate 326 has upright pieces 332, 334 formed with holes through which are penetrated the pins 322, 324, respectively, so as to permit the motor 316 to be swung about these pins 322, 324. To the mounting plate 326 is secured a leaf spring 336 arranged to surround the casing of the motor 326 and for urging the driving shaft 318 of the motor 316 against the rubber ring 292 of the flywheel 290. As shown in FIG. 10, the intermediate frame 3 has a battery receiving fitting 338 formed integral therewith and in which is received a battery 339. The battery receiving fitting 338 is provided at its left end with a leaf spring 341 made in contact with a negative terminal of the battery 339 and at its right end with projecting pieces 342 made in contact with a positive terminal of the battery 339.

Figure 11:
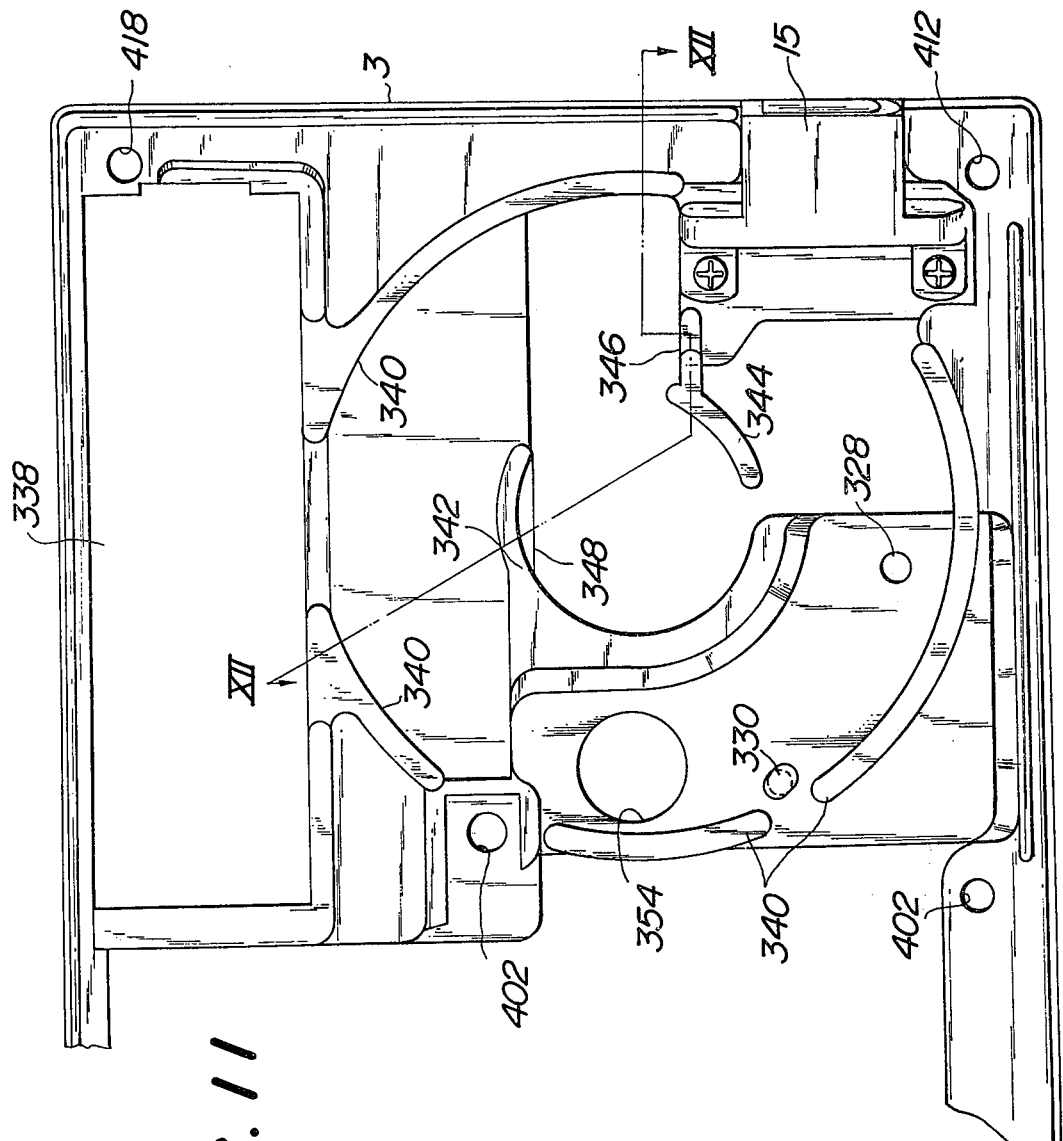
FIG. 11 is a plan view, illustrating a speaker mounting member usable in the tape recorder according to the invention.

In FIG. 11 is shown the front side of a part of the intermediate frame 3 having tapped holes with which are threadedly engaged the screws 328 and 330 for securing the above mentioned motor mounting plate 326 to the rear side of the intermediate frame 3. To the intermediate frame 3 is secured an A.C. source insert jack 15. In FIG. 11 is also shown a speaker mounting fitting. An annular fitting 340 for supporting a cone flange of a speaker, semi-circular fitting 342 for supporting a yoke portion of the speaker and resilient fitting 344 for resiliently supporting the yoke portion of the speaker are made integral with the intermediate frame 3 and extended perpendicular thereto. As shown in FIG. 11, the resilient fitting 344 is formed at its one end with an arm 346 made integral with the intermediate frame 3 and extended so as to form an arcuate resilient fitting for the purpose of resiliently supporting the yoke portion of the speaker. Thus, the free end of the resilient fitting 344 is bent inwards from the outer periphery of the yoke portion of the speaker contrary to the semi-circular fitting 342 whose inner periphery coincides with the outer periphery of the yoke portion of the speaker. Thus, the resilient fitting 344 is urged against the speaker when it is mounted on the intermediate frame 3.

Figure 12:
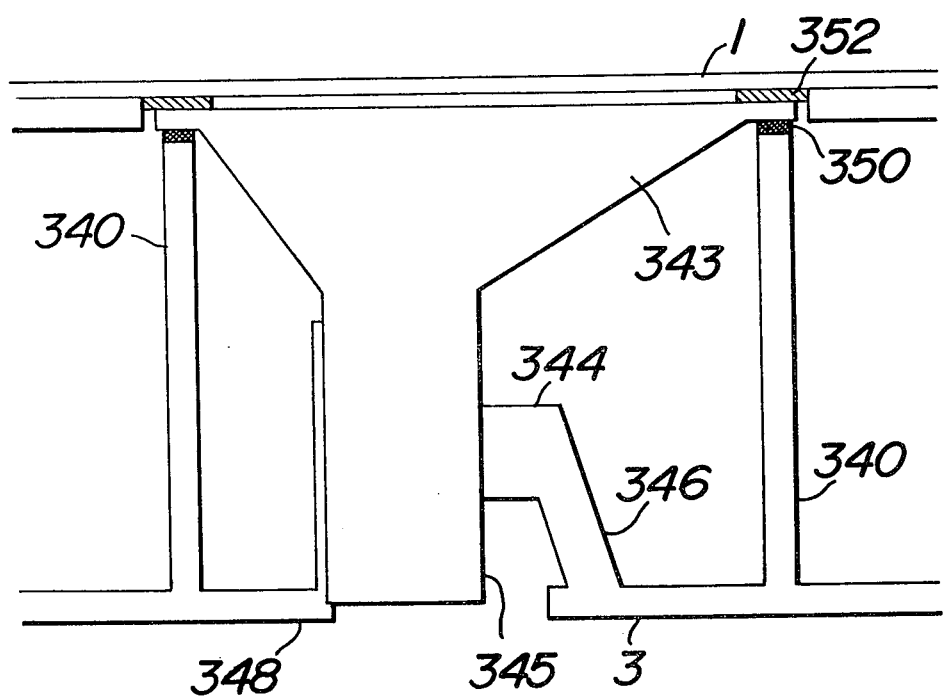
FIG. 12 is a sectional view taken on line XII-XII of FIG. 11.

The intermediate frame 3 is further provided with a stopper 348 projecting slightly from the lower end of the inner periphery of the semi-circular fitting 342 to form a stepped portion so as to support the lower end of the yoke portion of the speaker. As shown in FIG. 12, between the above mentioned annular vertical fitting 340 and the cone flange 343 on the other hand and between the cone flange 343 and the upper casing 1 on the other hand are inserted resilient rings 350 and 352, respectively, so as to prevent resonation at the time of producing undue oscillation or sound from being occurred on the cone part 345 of the speaker and firmly fix the speaker between the stopper 348 and the upper casing 1 disposed on an opening of the speaker. In addition, a sound passing hole 354 (FIG. 11) is formed on the intermediate frame 3 to improve the sound characteristic of the speaker.

When the speaker 343 is mounted on the speaker mounting fitting, the resilient fitting 344 is biassed outwards and then the yoke portion 345 of the speaker is inserted between the semi-circular fitting 342 and the resilient fitting 344 until it is brought into engagement with the stopper 348. In this case, the resilient fitting 344 serves to resiliently support the yoke portion 345 of the speaker. Thus, the speaker can firmly be secured through the above mentioned resilient rings 350, 352 to the intermediate frame 3.

Figure 13:
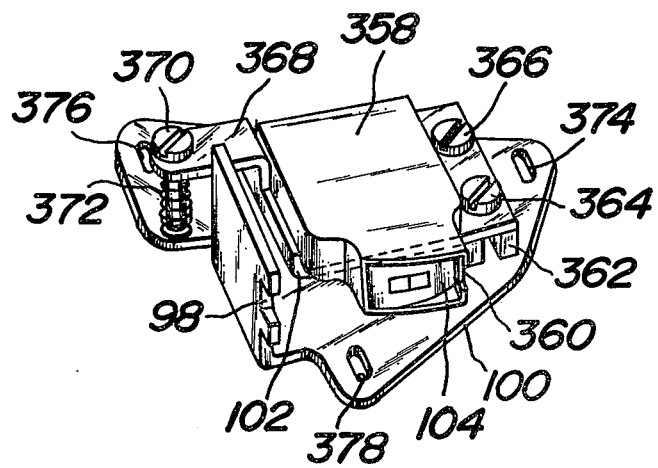
FIG. 13 is a perspective view, illustrating a magnetic head mounting member usable in the tape recorder according to the invention.

Now, the magnetic head mounting mechanism will be described with reference to FIG. 13. In a casing 358 made of metal, for example, is enclosed a magnetic head 104 whose effective gap portion only is exposed out of the casing 358. A first magnetic tape guide member 360 is formed on the casing 358 and constructed by a channel-shaped groove to guide the tape therethrough. The magnetic head casing 358 may be mounted on a mounting plate 102 and secured thereto by a suitable means, for example, spot welding. The mounting plate 102 is detachably secured to a base plate 100 by means of a pair of screws 364, 366 through a horseshoe-shaped spacer 362. On the base plate 100 is formed a second tape guide member 98 adapted to cooperate with the first tape guide member 360. The second tape guide member 98 is constructed by a channel-shaped groove through which is guided the tape.

The head mounting mechanism usable in the tape recorder according to the invention makes it possible to adjust both the position of the effective gap of the magnetic head 104 with respect to the base plate 100 and the position of the second guide member 98 with respect to the first guide member 360 by loosening the screws 364, 366 and using the one horseshoe-shaped spacer 362 having a suitable thickness or several horseshoe-shaped spacers 362 each having a suitable thickness and superimposed one upon the other. In addition, the mounting plate 102 is pivotally secured to the base plate 100 through a screw 370 threadedly engaged with both projecting piece 368 of the mounting plate 102 and the base plate 100, a coil spring 372 being wound around the stem of the screw 370. Thus, the rotation of the screw 370 ensures adjustment of the position of the mounting plate 102 with respect to the base plate 100 and hence adjustment of the head 104. Thus, it is possible to adjust the height and inclination of the head 104 with respect to the base plate 100. The base plate 100 is adjustably secured to the clicking plate 76 as shown in FIG. 4 by three pin holes 374, 376 and 378. Each of these pin holes may be elongated to form a slot like opening so as to adjust the distance between the tape and the magnetic head 104. In addition, as described with reference to FIG. 1, the screw 370 (FIG. 13) may be adjusted from the outside of the tape recorder through the hole 19 (FIG. 1) formed on the upper casing 1 after the upper casing 1 has been assembled together with the intermediate frame 3 and lower casing 2.

Figure 14A:
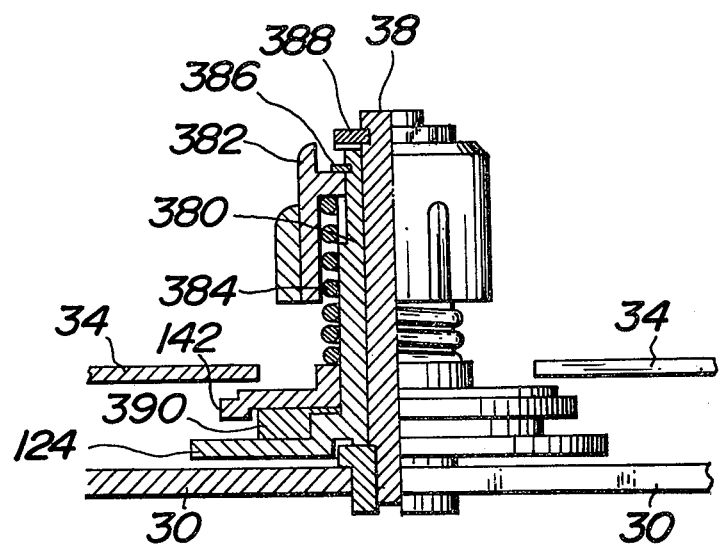
FIG. 14A is a partial sectional view, illustrating a tape take up shaft usable in the tape recorder according to the invention, the right half being shown in front view.
Figure 14B:
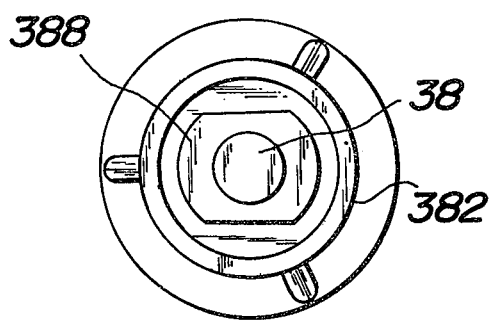
FIG. 14B is its plan view.

Then, the mechanisms for driving the tape supply shaft 40 and tape take up shaft 38 will be described with reference to FIGS. 14A and 14B. These mechanisms are the same as each other so that only the tape take up shaft mechanism only will be described. In FIG. 14A, are shown the right half of the tape take up shaft mechanism in front elevation and the left half thereof in section. Around the take up shaft 38 is closely fitted a sleeve 380 having a gear 124 made integral therewith. To the sleeve 380 are rotatably fitted a gear 142 and slidably fitted a hub 382 which engages with a core of a tape wound body in the cassette, the hub 382 being slidable in a lengthwise direction of the sleeve 380. The sleeve 380 is surrounded by a compression coil spring 384 which biases the hub 382 upwards and the gear 142 downwards. To the sleeve 380 is secured a ring 386 adapted to act as a stopper so as to maintain the hub 382 in a position shown in FIG. 14A. Provision is made of a ring 388 secured to the shaft 38 and for fixing the sleeve 380 to the shaft 38. A ring 390 made of felt is held between the gear 142 and the gear 124. As described with reference to FIG. 4, the gear 142 is threadedly engaged with the gear 140 and the brake shoe 122 is urged against the gear 124. In the recording, reproducing and fast-feeding modes of operation, the brake shoe 122 becomes disengaged from the gear 124 and the rotation of the gear 142 threadedly engaged with the gear 140 is transmitted through the felt ring 390 acting as a frictional ring to the gear 124 so as to cause rotation of the hub 382 through the sleeve 380. Next, in the stop condition, the motor 316 is deenergized to bring the brake shoe 122 into engagement with the gear 124. In this case, the large moment of inertia of the flywheel 290 causes the gear 142 to be rorated a little further. But, the gear 124 is stopped by the brake shoe 122 engaged therewith to stop that shaft 38 at a given instant. Thus, the mechanism makes it possible to absorb the inertia of the flywheel 290 and prevent various parts from being subjected to undue forces.

The coil spring 384 serves not only to attain the above mentioned effect, but also to smoothly guide the cassette when it is mounted on the hub 382. That is, as shown in FIG. 14B, the hub 382 could not be rotated around the sleeve 380, but is slidable in its lengthwise direction, and as a result, when the cassette is mounted on the hub 382, it is possible to move the hub 382 downwards. Thus, if the tape wound core of the cassette is mounted on the hub 382, the hub 382 is depressed against the action of the spring 384 until the core arrives at a certain lower level. Then, the hub 382 is returned upwards by the action of the spring 384. Thus, the hub 382 does not hinder the downward movement of the cassette at the time of mounting it on the cassette receiving plate 34.

In FIG. 15 is shown the intermediate frame 3 as a whole. The motor 316 secured to the intermediate frame 3 is shown in FIG. 15, but the chassis 30, speaker 343 and battery 339 are not shown therein. The above described speaker mounting fittings 340, 343, 344, 346 and the battery receiving fitting 338 are formed on the right side of the intermediate frame 3 and made integral therewith. In addition, the A.C. supply source connecting jack 15 is secured thereto. The fitting for mounting the chassis 30 is formed on the left side of the intermediate frame 3. The chassis 30 is secured to the intermediate frame 3 by screws extending through the holes 392, 394, 396, 398 formed on the chassis 30 (FIG. 9) and threadedly engaged with corresponding holes 400, 402, 404, 406 formed on the intermediate frame 3, respectively. In addition, the level meter 11, microphone jack 12, remote switch jack 13 and earphone jack 14 are secured to the left end of the intermediate frame 3. Moreover, a switch fitting 408 is formed on the intermediate frame 3 so as to secure the above mentioned projection 270 (FIG. 7) of the switch to the fitting 408 by a pair of screws. A bridge 410 is also projected downwards from the intermediate frame 3 so as to reinforce the intermediate frame 3 and support all of wiring codes. A printed circuit board, constituting the electric circuit of the tape recorder, is moutned on the lower side of the intermediate frame 3 through a suitable support and separated therefrom.

As seen from the above, the chassis 30, speaker and printed circuit board can be secured to the intermediate frame 3 in a simple and rapid manner. After necessary mechanisms, members and parts have been assembled with the aid of the intermediate frame 3, screws (not shown) are inserted into holes 412, 414, 416 and 418 formed on the four corners of the intermediate frame 3 and the upper ends of these screws are threadedly engaged with the upper casing 1 to secure the upper casing 1 to the intermediate frame 3. Then, the lower casing 2 is disposed on the rear side of the intermediate frame 3 and screws 420, 422, 424 and 426 (FIG. 1F) are inserted into holes formed on the four corners of the lower casing 2. The upper ends of these screws are threadedly engaged with tapped holes formed on the rear side of the intermediate frame 3 to secure the lower casing 2 to the intermediate frame 3. The screw 426 (FIG. 1F) serves to secure the cover 10 to the intermediate frame 3. A plurality of ridges 428 are formed along the peripheral edges of the intermediate frame 3 so as to facilitate the positioning of the upper and lower casings 1 and 2 with respect to the intermediate frame 3. As seen from the above, the tape recorder according to the invention can be assembled in a simple and reliably manner.

Figure 16A:
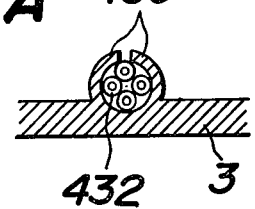
FIGS. 16A, 16B and 16C are sectional views, illustrating methods of connecting wiring codes usable in the tape recorder according to the invention.
Figure 16B:
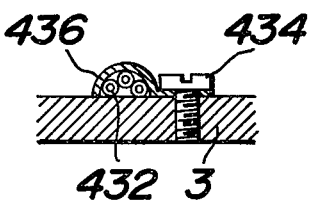
Figure 16C:
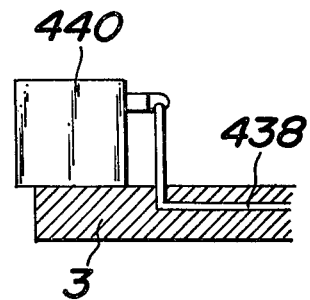

In FIGS. 16A, 16B and 16C is illustrated how to treat the wiring. In the conventional superminiature cassette tape recorder, provision is made of a printed circuit board, constituting the electric circuit of the tape recorder, so as to make the electric circuit parts small in size. The electric circuit parts arranged on the print circuit board such as the battery, motor, speaker, switch and various jacks are connected each other through wiring codes. For this purpose, provision must be made of several numbers of wiring codes in an extremely small space, and as a result, the wiring of these cords becomes considerably complicated and troublesome. In order to avoid such disadvantage, the intermediate frame 3 is used as means for wiring the cords. A pair of sector-shaped ridges 430 are formed integral with the intermediate frame 3 so as to enclose the cords 432 in a space formed between these ridges 430 as shown in FIG. 16A. Alternatively, a semi-cylindrical strip 436 is secured to the intermediate frame 3 by a screw 434 so as to arrange the cords 432 in a space formed by the semi-cylindrical strip 436 as shown in FIG. 16B. In addition, a conductor 438 may be embedded in the intermediate frame 3 and projected outwards at a suitable position, so as to connect a desired electric part 440 to the projected end of the conductor 438.

As seen from FIG. 4, in the recording, reproducing, fast-feeding and rewinding modes of operation, if the sliding plate 76 is moved downwards and leftwards, the lower end 61 of the sliding plate 76 slides on the upper side of the third projection 62 formed on the cassette push up lever 52, and as a result, when the tape recorder is in the recording, reproducing, fast-feed or rewinding modes of operations, the rotation of the cassette push up lever 52 and hence the push up of the cassette is prevented.

What is claimed is:

1. A superminiature cassette tape recorder comprising a flat elongated upper casing; a flat elongated lower casing; an intermediate frame held between said upper and lower casings and having fittings mounted thereon and adapted to mount thereon electrical components; a chassis secured to said intermediate frame and supporting a tape driving mechanism and tape operating members such as record-reproduction, fast-feed and rewind operating members; a printed circuit mounted on said intermediate frame and constituting an electric circuit; a sliding plate slidably mounted on said chassis for movement along an L-shaped passage and having a record-reproduction magnetic head mounted thereon; and a lever plate pivotally secured at its one end to said chassis and having a leaf spring secured at its one end to said lever plate, said lever plate having a manually operable first projection for raising a cassette mounted on said chassis, a second projection penetrating beneath said leaf spring and for raising it together with said lever plate against its spring action, and a third projection adapted to be engaged with the lower end of said sliding plate in the recording-reproducing, fast-feeding and rewinding modes of operation of the tape recorder so as to prevent the cassette from being removed; in which the improvement comprises, said tape operating members, a ball resiliently supported by chassis and partially projected upwards through a gourd-shaped hole formed on said sliding plate, said ball being clicked into a circular hole formed at a position on said sliding plate above said gourd-shaped hole upon said sliding plate being moved downwards and clocked into the right side hole portion of said gourd-shaped hole upon said sliding plate being moved leftwards, thereby maintaining said sliding plate at the position thus moved; a rotatable switch button pivotally secured substantially at its center to one face of said chassis so as to be rotatable in a direction perpendicular to the side edge of casing and selectively assume a recording-reproducing position, a rewinding position, and a stopping position; a lever pivotally secured to said chassis and having an erasing head and a projection; a record push button slidably secured to an intermediate plate and having a projection adapted to be engaged with said projection of said lever when said push button is not depressed and disengaged therefrom when said push button is depressed; a pin secured to a further lever pivotally secured to one end of said rotatable switch button and slidably extending through a rearwardly faced and inclined L-shaped groove formed on said sliding plate and a groove composed of an upwardly inclined leg and a downwardly inclined leg integrally joined at their centers with a common short horizontal leg formed on said chassis; a fast-feed button secured to a lever slidably mounted on the opposite face of said intermediate frame and engaged with said groove, said fast-feed push button biased upwards and engageable at its lower end with said projection of said record push button in a manner such that when said record push button is depressed the fast-feed push button is prevented from being depressed; and a switch having four resilient conductive contact pieces arranged in parallel to each other and each secured at its lower end to an insulated board fastened to said slidable lever, said contact pieces constituting two switch contacts adapted to selectively connect a capstan shaft driving motor to two electric circuits, one for driving said motor at a constant speed and the other for driving said motor at a high speed, said two switch contacts being selectively opened and closed by said pin secured to one end of said rotatable switch button and a pin secured to said fast-feed push button.

2. A superminiature cassette tape recorder as claimed in claim 1, in which the improvement comprises a lever pivotally secured substantially at its center to said chassis and having at its lower end a brake shoe, said brake shoe being urged against a gear secured to a take up shaft when said switch button is in its stopping position and spaced therefrom when said switch button is in its recording-reproducing and rewinding positions; a capstan shaft extended through said intermediate plate and rotatably journalled in bearing; a pulley secured to said capstan shaft and having a square groove at its periphery; a lever pivotally secured at its upper end to said chassis; a pulley pivotally secured to the lower end of said lever and having a channel-shaped groove at its periphery; an endless rubber belt having a square cross-section adapted to be brought into engagement with said pulley secured to said capstan shaft and then twisted and with said pulley pivotally secured to said lever; an intermediate gear pivotally secured to said chassis adapted to be brought into engagement with a gear frictionally slidable along said take up shaft; a tape supply shaft having a gear slidably fitted around said shaft and adapted to be brought into engagement with said belt when said switch button is in its rewinding position.

3. A superminiature cassette tape recorder as claimed in claim 1, in which the improvement comprises fittings formed on one face of said intermediate frame and made annular so as to form an annular fitting for supporting a cone flange of a speaker thereon, made semicircular so as to form a semicircular fitting for mounting a yoke portion of said speaker, and made arcuate so as to form an arcuate fitting for resiliently supporting said yoke portion of said speaker, said semicircular fitting being provided at its lower end with a stepped portion for supporting the lower end of the yoke portion of said speaker, and resilient rings being inserted between, respectively, said annular fitting and the cone flange on the one hand and between the cone flange and the upper casing on the other hand.

4. A superminiature cassette tape recorder as claimed in claim 1, in which the improvement comprises a pair of sector-shaped ridges mounted on said intermediate frame and enclosing insulated wires therein; and a semi-cylindrical strip secured to said intermediate frame and enclosing said insulated wires therein, said insulated wires being arranged on and adapted to be embedded in said intermediate frame.

5. An improved superminiature cassette tape recorder as claimed in claim 1, in which the improvement comprises a fin secured to said cassette, and a fin detecting lever provided at its lower end with a tag opposed to said fin whereby, when said switch button is brought into the recording position and said record button is depressed, said tag comes into engagement with said fin to prevent rotation of said fin detecting lever, and said erasing head secured to said lever is not moved downwards to prevent erroneous erasure of the records on the tape.

* * * * *